United States Patent [19]
Leonard

[11] 4,404,886
[45] * Sep. 20, 1983

[54] NOTE READING OCTAVE ISOLATOR

[76] Inventor: Verna M. Leonard, 9360 N. Blackstone, Fresno, Calif. 93710

[*] Notice: The portion of the term of this patent subsequent to Oct. 20, 1998, has been disclaimed.

[21] Appl. No.: 293,555

[22] Filed: Aug. 17, 1981

[51] Int. Cl.³ .............................................. G09B 15/02
[52] U.S. Cl. .................................. 84/471 R; 84/478; 84/480
[58] Field of Search ........................ 84/471, 473, 480

[56] References Cited
U.S. PATENT DOCUMENTS
4,295,407  10/1981  Leonard .......................... 84/471 VL Primary Examiner—Lawrence R. Franklin
Attorney, Agent, or Firm—Ralph S. Branscomb

[57] ABSTRACT

A musical teaching and playing aid has a sheath with a front panel defining spaced octaves of a keyboard instrument keyboard with slits just above the keys for the insertion of insert cards each of which is identified as to the octave above which it will be inserted, with each of these insert cards having a first tier of scale or chord tones which align with and name the keys on the keyboard, and a second tier of notes on a musical staff, which notes fall within the general range of the keys on the keyboard and the octave named on the card and which are visible by raising the card from a first position to a second position, whereby the independence of each octave is stressed by its isolation from adjacent octaves, disrupting the usual continuity of the keys, and the notes which fit within that octave and their names are identified on the removeable card to facilitate identification of note position on the staff with octave position in the range of notes on the keyboard.

8 Claims, 4 Drawing Figures

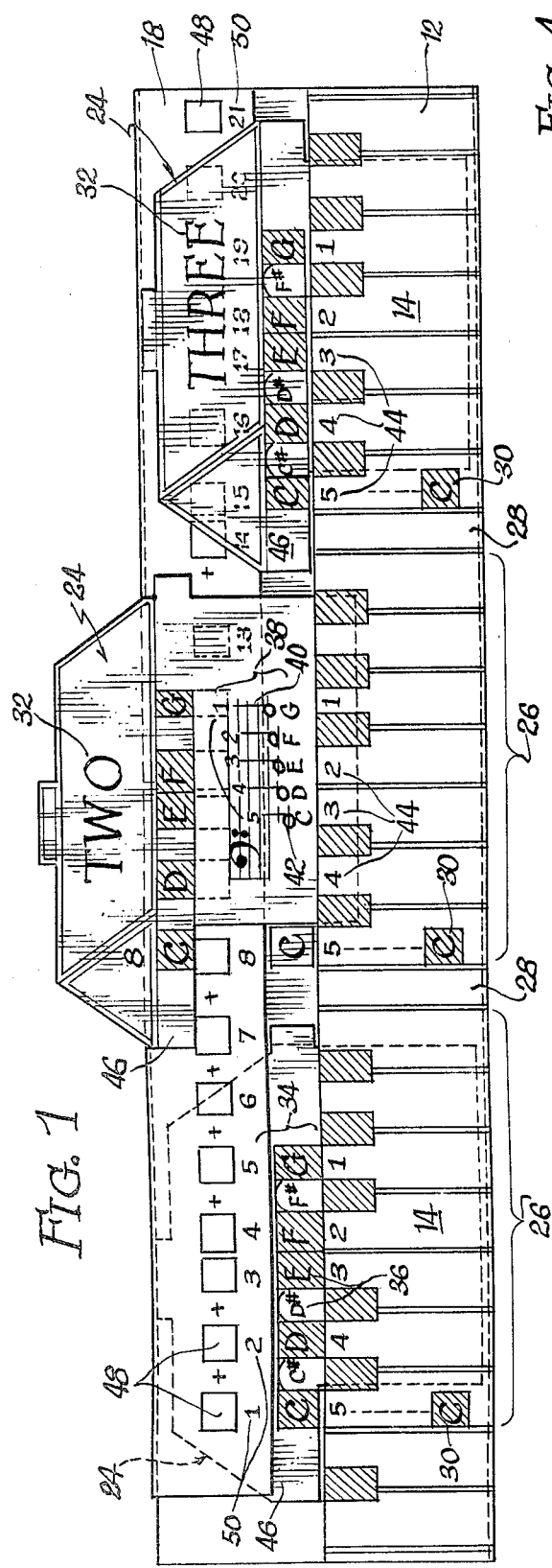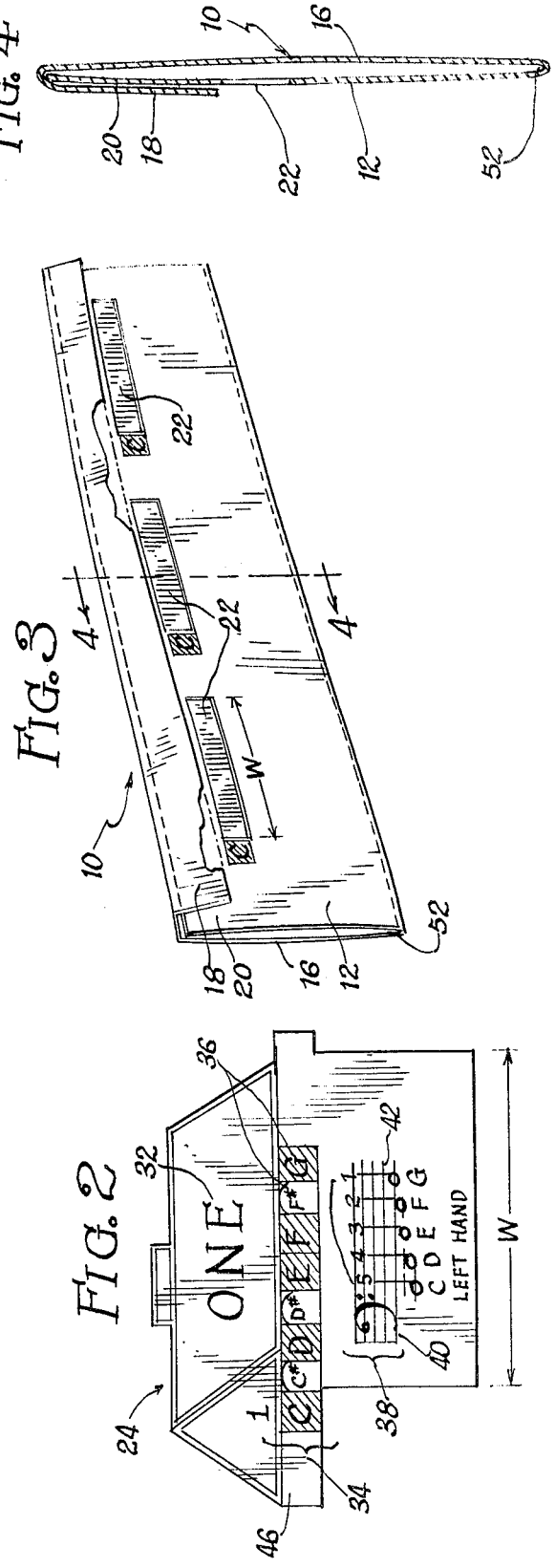

NOTE READING OCTAVE ISOLATOR

BACKGROUND OF THE INVENTION

The history of music has produced a multitude of different devices, aids, dials, and charts to expedite the learning of musical chords, progressions, inversions, note reading, keyboard and octave structure, and everything else pertaining to the structure of music.

There are also a number of different teaching aids which resemble somewhat the instant device in that they have a display of a piano or organ keyboard with various notes, chords, progressions, inversions and the like aligned with the keys of the keyboard. The general intent of these devices is to instruct the student as to the continuous nature of the scale, and the manner in which all of these various aspects of music correlate with the continuous sequencing of keys and scale tones.

However, the very continuity of the keyboard of a musical instrument is in itself confusing to the student and makes it very difficult to consider the various octaves as having their own separate identity and characteristics, and being correlated with certain notes and note reading.

In such devices as may isolate the octaves for purposes of identification separately from the other octaves, chords are generally taught only in the root, or non-inverted position so that the chords of, for example, the cycle of fourths or fifths will fit within the narrow confines of the isolated octave.

SUMMARY OF THE INVENTION

The present invention breaks the bounds of conventional keyboard instruction aids by subdividing the keyboard into octaves which are isolated by a space from adjacent octaves, enabling the student to clearly visualize the separate octave structure. Each octave is named by virtue of a named insert card which correlates only with a particular slit of a certain octave in the device, and this card correlates to the keyboard displayed on the front of the device both as to scale tone naming of the keyboard keys, and chord notes on a staff falling within the range set forth on the keyboard.

However, to eliminate the "boxed in" feeling, previously a necessary adjunct to the separate-octave concept, these insert cards overlap to the left of the octave so that the named scale tones which fall within the octave and are named on the card can be extended to the left to take in keys below the octave in question, giving the student a greater feeling of freedom to select inversions having keys falling below the root of the octave, so that the student both is able to isolate an octave and also play beyond the octave in both directions while using the octave as a base, to eliminate any feeling of discontinuity or confinement.

BRIEF DESCRIPTION OF THE DRAWINGS

FIG. 1 is a front elevation view showing a three octave panel with insert cards in the three different possible positions;

FIG. 2 is a front elevation view of an insert card in isolation;

FIG. 3 is a perspective view of the sheath in isolation;

FIG. 4 is a section taken along line 4—4 of FIG. 3.

DETAILED DESCRIPTION OF THE PREFERRED EMBODIMENT

The main body of the invention in its preferred form comprises a sheath 10 having a front panel 12 with a display 14 of a keyboard thereon, a depending flap 18 attached to the top of the back panel. Also, the front panel preferably has an upper extension 20 so that slits 22 may be defined to receive insert cards all of which are identified by the numeral 24 despite minor differences.

It should be noted that the keyboard 14 is divided into octaves 26 of keys, and each of these octaves is separated from adjacent octaves by a space 28, and the key just to the right of each space is identified at 30 with the letter naming the key signature. Different sheaths having different front panels with the octaves arranged differently are necessary to cover key signatures other than the key of C which is shown, but such extrapolations should be obvious from this description.

Each of the insert cards 24 identifies at 32 the octave to which the card corresponds. In addition, the cards have two tiers of indicia, a first tier 34 which identifies the scale tones 36 of the keys with which these cards align when they are inserted up to their hilt in a first insertion position best illustrated by the insert card in octave three in FIG. 1. The scale tone names 36 align exactly with the keys of the keyboard 14, making it clear what their names are.

A second tier of information is shown at 38 and comprises a staff 40 which in the illustrations have scales 42 on them but could as easily have chords or other note reading, providing the notes fall basically within the octave identified at 32 on the respective card. When the card is pulled up into its second position as shown by the card for octave two in FIG. 1, it can be seen that the staff 40 is now visible above the keys, and the scale, melody, or chords identified by the notes 42 of the scale can be played. Finger position on the keyboard may be indicated at 44.

Thus, each of the insert cards may be put in a first position shown to the right of FIG. 1 where the student can identify the names of the keys, it can then be raised to the second position shown in the second station of FIG. 2 wherein the staff is visible and the notes can be played, or the card can be removed entirely, permitting the student to use it separately on an actual piano, or requiring that the student insert it in the proper position in the sheath 10 to reinforce the knowledge that in fact a separate card, and separate notes on the staff, are associated with each of the isolated octaves of the keyboard.

An additional and significant feature of the invention is the overhanging end 46 of each of the cards which overlay the spaces 28, and preferably even extend a key beyond this space. These spaces may be imprinted with the scale tones of the keys over which they would fall if there were an adjacent octave, or they can be left blank, as shown, to permit the student to fill it in for himself. The latter may be preferable, in that this way the student will be able to distinguish his own writing and will not become confused because these scale tones do not overly pre-printed keys to which they correspond.

The overhanging card edge coupled with the spaces 28 tends to further isolate each octave, but permits the student to play inversions and otherwise lap over to the left of the bottom most scale tone of the keyboard so that he is not straight-jacketed in the octave in which he is working. This is a major problem with octave training, and leads the student to be versed in root chords but possibly incompetent in the chord inversions which are generally preferable and often more colorful than the roots. The combination of the overhanging edge 46 and the space 28 therefore, together go a long way toward eliminating a major problem in music as is currently taught.

Turning again to the physical structure of the invention, the depending flap 18 can be swung upward and downward, and when it is in its down position any of the insert cards 24 may either pass in front of or behind the depending flap. The first octave card in FIG. 1 passes behind this flap, which leaves space only to expose the first tier 34 of indicia which comprise the scale tones aligned with the underlying keyboard. On the front face of this flap is preferably a series of square spaces 48 beneath which are numbers 50 which identify sequentially the position of the particular key in a continuous diatonic progression. In the preferred embodiment illustrated these squares are blank, but there also may be provided pre-printed diatonic scale tone identification or strips which are preprinted which may be inserted across this space. The benefit of this series of spaces is to give each and every scale tone which falls within the key signature an identifying number, which tends to help the student sort through the repetitively named keys which repeat every octave.

The depending flap also serves to capture the insert cards within a tray 52 defined by the back panel 16 and the front panel 12 so that the parts will not become scattered when not in use.

As thus shown and described, the invention provides an advanced method of learning both note identification of the notes in every octave, and note reading associated with every octave in a fashion which isolates each octave for separate study and yet overlaps each octave sufficiently that a student is able to familiarize himself with inversions and adjacent notes without being strictly confined to the octave in which he studies.

While I have described the preferred embodiment of the invention, other embodiments may be devised and different uses may be achieved without departing from the spirit and scope of the appended claims.

What is claimed is:

1. A note reading octave isolator comprising:
   (a) a front panel having a display of a portion of a keyboard thereon with keys in a certain octave;
   (b) at least one insert card insertable behind said front panel and having first and second positions assumable relative to said front panel and including means to hold said insert card in at least one of said positions;
   (c) said insert card having an octave indentifier identifying said certain octave and including first and second tiers of indicia, said first tier comprising scale tone name naming by juxtaposition the scale tones of said keys and aligning with same in said first position, and said second tier displaying a group of notes on a staff generally falling within said certain octaves and being hidden behind said front panel in said first position and juxtaposed with said keys on said front panel in said second position, whereby a user can alternate between said first and second position to alternately identify notes with a range on said keyboard, or identify the keys of said keyboard.

2. Structure according to claim 1 wherein said front panel is elongated and said keyboard display covers several octaves, and each of said octaves has a corresponding insert card.

3. Structure according to claim 2 wherein said front panel is part of a generally planar sheath having a back panel extending up from the bottom edge of said front panel to define a tray and an upper flap depending from the top of said back panel, said flap being dimensioned to selectably lap over the tops of said insert cards to capture same in said tray and disclose said first tier between said flap and said front panel.

4. Structure according to claim 3 wherein said front panel has an upper extension falling behind said insert cards and upper flap and defining longitudinal slits to receive said insert cards.

5. Structure according to claim 2 wherein said keyboard display comprises sequential series of diatonic octaves separated by spaces whereby said front panel will not align on an actual keyboard and the individuality of the octaves is stressed.

6. Structure according to claim 5 wherein the key of each octave to the right of each of six spaces defines the root tone of the key signature and said insert cards have overhanging extensions overlapping said spacer to the left and defining space to the left of said first tier of indicia whereby the user can inscribe notes below the octave of the insert cards.

7. Structure according to claim 1 wherein said keyboard has spaced manual root keys to identify a key signature and said flap has numbered spacers corresponding to a continuous diatonic scale sequence begining with the lowest of said root keys and being aligned with the keys of said keyboard whereby a user can inscribe the appropriate scale tones in said spacer and learn key identification.

8. Structure according to claim 1 wherein said insert cards are removable and reinsertable for instructional purposes.

* * * * *